US012723865B2

(12) United States Patent
Song et al.

(10) Patent No.: US 12,723,865 B2
(45) Date of Patent: Sep. 1, 2026

(54) OPTICAL SELF-HETERODYNE DETECTION SYSTEM INCLUDING OPTICAL FREQUENCY COMB LIGHT SOURCE

(71) Applicant: ELECTRONICS AND TELECOMMUNICATIONS RESEARCH INSTITUTE, Daejeon (KR)

(72) Inventors: Minhyup Song, Daejeon (KR); Minje Song, Daejeon (KR); Joon Tae Ahn, Daejeon (KR); Taehyun Lee, Daejeon (KR); Seungyoung Lim, Daejeon (KR); Young Jin Jung, Daejeon (KR); Gyu Dong Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 268 days.

(21) Appl. No.: 18/528,198

(22) Filed: Dec. 4, 2023

(65) Prior Publication Data

US 2024/0200927 A1 Jun. 20, 2024

(30) Foreign Application Priority Data

Dec. 14, 2022 (KR) ........................ 10-2022-0175208
Nov. 22, 2023 (KR) ........................ 10-2023-0163413

(51) Int. Cl.
*G01B 9/02001* (2022.01)
*G01J 9/02* (2006.01)

(52) U.S. Cl.
CPC ........ *G01B 9/02008* (2013.01); *G01J 9/0246* (2013.01); *G01J 2009/0288* (2013.01)

(58) Field of Classification Search
CPC ................ G01B 9/02008; G01J 9/0246; G01J 2009/0288
See application file for complete search history.

(56) References Cited

U.S. PATENT DOCUMENTS 5,032,002 A * 7/1991 Fonneland ............ G02B 27/46 349/1
6,646,746 B1 11/2003 Sorin et al.
(Continued)

FOREIGN PATENT DOCUMENTS

CN 112129491 A 12/2020
JP H3-257336 A 11/1991
(Continued)

OTHER PUBLICATIONS

Ferdous, Fahmida et al. "Probing coherence in microcavity frequency combs via optical pulse shaping". Optics Express, vol. 20, No. 19, 2012, pp. 21033-21043. (Year: 2012).*
(Continued)

*Primary Examiner* — Michael A Lyons

(57) ABSTRACT

Provided is an optical self-heterodyne detection system. The system includes a light source configured to generate light, a photodetector configured to detect the light, a programmable filter provided between the photodetector and the light source, and an electrical spectrum analyzer connected to the photodetector and configured to analyze a frequency and wavelength of the light using a detection signal of the photodetector. The light source may include a frequency comb light source.

13 Claims, 5 Drawing Sheets

(56) References Cited

U.S. PATENT DOCUMENTS

| | | | |
|---|---|---|---|
| 6,819,423 B2 | 11/2004 | Stehle et al. | |
| 2008/0260393 A1 | 10/2008 | Youn et al. | |
| 2008/0309931 A1* | 12/2008 | Silberberg | G01N 21/65 356/301 |
| 2010/0002881 A1 | 1/2010 | Youn et al. | |
| 2014/0314108 A1 | 10/2014 | Anandarajah et al. | |
| 2015/0023375 A1* | 1/2015 | Miyanaga | H01S 3/1106 372/25 |
| 2016/0248220 A1 | 8/2016 | Ou et al. | |
| 2020/0266900 A1 | 8/2020 | Jin et al. | |
| 2022/0178752 A1* | 6/2022 | Watanabe | G02F 1/3551 |

FOREIGN PATENT DOCUMENTS

| | | |
|---|---|---|
| JP | 2000-275107 A | 10/2000 |
| JP | 2009-116242 A | 5/2009 |
| JP | 2015-225328 A | 12/2015 |
| JP | 2016-148522 A | 8/2016 |
| JP | 2017-146217 A | 8/2017 |
| JP | 2019-39972 A | 3/2019 |
| KR | 2003-0022292 A | 3/2003 |
| WO | 2018/048306 A1 | 3/2018 |

OTHER PUBLICATIONS

Xiong, Shilin et al. "Calculating the Effective Center Wavelength for Heterodyne Interferometry of an Optical Frequency Comb". Applied Sciences, 2018, 8, 2465. (Year: 2018).*

Twayana, Krishna et al. "Spectral interferometry with Frequency Combs". Micromachines (Basel), Apr. 14, 2022; 13(4): 614. (Year: 2022).*

Wu, Linghua et al. "Linewidth measurement based on a delayed self-heterodyne interferometer using a Mach-Zehnder modulator". 2012 Second International Conference on Instrumentation, Measurement, Computer, Communication and Control, Harbin, China, 2012, pp. 1309-1312. (Year: 2012).*

Xue, Xiaoxiao et al. "Programmable Single-Bandpass Photonic RF Filter Based on Kerr Comb from a Microring". Journal of Lightwave Technology, vol. 32, No. 20, Oct. 15, 2014, pp. 3557-3565. (Year: 2014).*

Atsushi Ishizawa et al., "Phase-noise characteristics of a 25-GHz-spaced optical frequency comb based on a phase- and intensity-modulated laser," Opt. Express/21(24), 2013.

* cited by examiner (A)

(B)

(C)

(D)

OPTICAL SELF-HETERODYNE DETECTION SYSTEM INCLUDING OPTICAL FREQUENCY COMB LIGHT SOURCE

CROSS-REFERENCE TO RELATED APPLICATIONS

This U.S. non-provisional patent application claims priority under 35 U.S.C. § 119 of Korean Patent Application No. 10-2022-0175208, filed on Dec. 14, 2022, and No. 10-2023-0163413, field on Nov. 22, 2023, the entire contents of which are hereby incorporated by reference.

BACKGROUND

The present disclosure herein relates to an optical detection system, and more particularly, to an optical self-heterodyne detection system including an optical frequency comb light source.

In general, light sources having excellent spectral stability and narrow linewidth characteristics are usefully used in the fields of coherent optical communication systems, coherent detection, microwave photonics, precision spectroscopy, etc. Requirements for light sources may vary in various application fields. In order to determine practicality of a light source, solutions for accurately measuring and characterizing the light source are required.

SUMMARY

The present disclosure provides an optical self-heterodyne detection system capable of measuring a wideband laser linewidth stably and for a long time.

An embodiment of the inventive concept provides an optical self-heterodyne detection system including: a light source configured to generate light; a photodetector configured to detect the light; a programmable filter provided between the photodetector and the light source; and an electrical spectrum analyzer connected to the photodetector and configured to analyze a frequency and wavelength of the light using a detection signal of the photodetector, wherein the light source includes a frequency comb light source.

In an embodiment, the programmable filter may include a pulse shaper.

In an embodiment, the optical self-heterodyne detection system may further include an interferometer provided at a front end and back end of the programmable filter.

In an embodiment, the interferometer may include a Mach-Zehnder interferometer.

In an embodiment, the interferometer may include: an input coupler provided between the light source and the programmable filter; an output coupler provided between the programmable filter and the photodetector; and branch waveguides branching off from the input coupler and connected to the output coupler.

In an embodiment, the branch waveguides may include: a first branch waveguide; and a second branch waveguide that is in parallel with the first branch waveguide.

In an embodiment, the programmable filter may include: a first programmable filter provided to the first branch waveguide; and a second programmable filter provided to the second branch waveguide.

In an embodiment, the first and second programmable filters each may include a pulse shaper.

In an embodiment, the first and second programmable filters each may include an optical bandpass filter.

In an embodiment, the photodetector may include a photodiode.

In an embodiment of the inventive concept, an optical self-heterodyne detection system includes: a frequency comb light source configured to generate light; a photodetector configured to detect the light; an electrical spectrum analyzer connected to the photodetector and configured to analyze a frequency and wavelength of the light using a detection signal of the photodetector; an interferometer including an input coupler provided between the frequency comb light source and the photodetector and receiving the light, branch waveguides branching off from the input coupler, and an output coupler connected to the branch waveguides; and programmable filters provided to the branch waveguides and selecting peak wavelengths of the light.

In an embodiment, the programmable filters each may include a pulse shaper or an optical bandpass filter.

In an embodiment, the branch waveguides may include: a first branch waveguide; and a second branch waveguide that is in parallel with the first branch waveguide.

In an embodiment, the programmable filters may include: a first programmable filter connected to the first branch waveguide; and a second programmable filter connected to the second branch waveguide.

In an embodiment, the optical self-heterodyne detection system may further include a polarization controller connected to the second branch waveguide between the second programmable filter and the output coupler.

In an embodiment of the inventive concept, an optical self-heterodyne detection system includes: a frequency comb light source configured to generate light; a photodetector configured to detect the light; an electrical spectrum analyzer connected to the photodetector and configured to analyze a frequency and wavelength of the light using a detection signal of the photodetector; an interferometer including an input coupler provided between the frequency comb light source and the photodetector and receiving the light, first and second branch waveguides branching off from the input coupler, and an output coupler connected to the first and second branch waveguides; first and second programmable filters provided to the first and second branch waveguides and selecting peak wavelengths of the light; and a first nonlinear crystal plate provided between the frequency comb light source and the input coupler.

In an embodiment, the optical self-heterodyne detection system may further include second nonlinear crystal plates between the programmable filters and the output coupler.

In an embodiment, the first nonlinear crystal plate and the second nonlinear crystal plates may include beta barium borate (BBO), periodically poled potassium titanyl phosphate (PPKTP), and periodically poled lithium niobate (PPLN).

In an embodiment, the first nonlinear crystal plate and the second nonlinear crystal plates may include silicon (Si), silicon nitride (SiN), aluminum gallium arsenide (AlGaAs), or silicon carbide (SiC).

In an embodiment, the optical self-heterodyne detection system may further include a third programmable filter provided between the output coupler and the photodetector.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
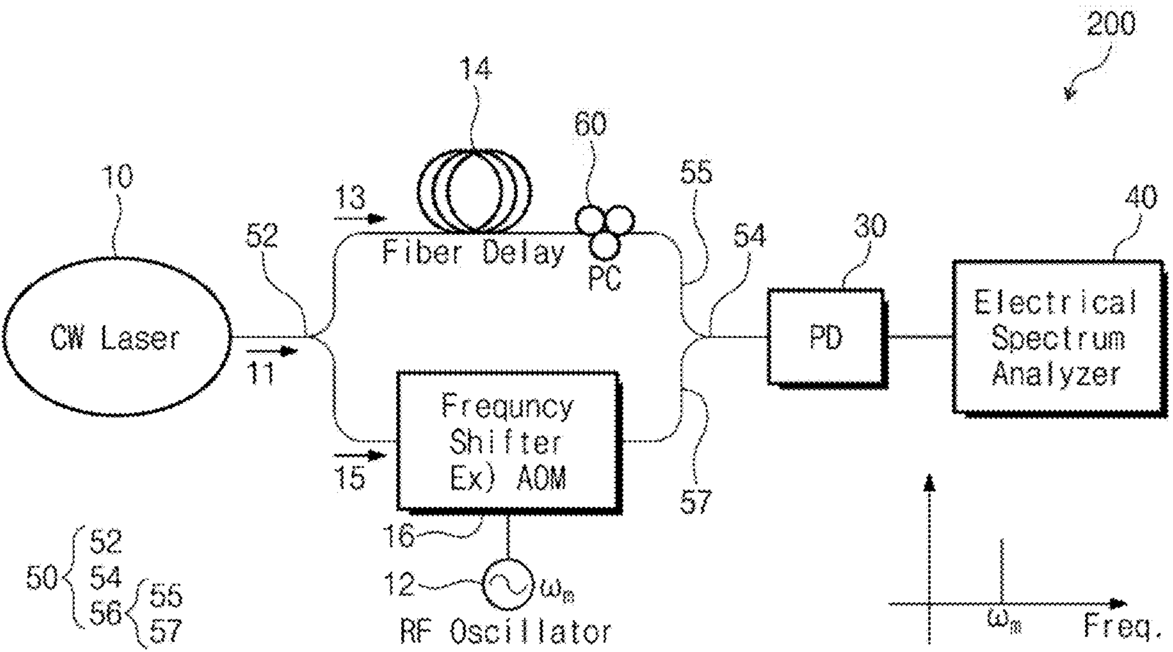
FIG. 1 is a diagram illustrating an example of a typical optical heterodyne detection system.

Embodiments of the inventive concept will now be described in detail with reference to the accompanying drawings. Advantages and features of embodiments of the inventive concept, and methods for achieving the advantages and features will be apparent from the embodiments described in detail below with reference to the accompanying drawings. However, the inventive concept may be embodied in different forms and should not be construed as limited to the embodiments set forth herein. Rather, these embodiments are provided so that this disclosure will be thorough and complete, and will fully convey the scope of the inventive concept to those skilled in the art, and the inventive concept is only defined by the scope of the claims. Like reference numerals refer to like elements throughout.

The terminology used herein is not for delimiting the embodiments of the inventive concept but for describing the embodiments. The terms of a singular form may include plural forms unless otherwise specified. It will be further understood that the terms "includes", "including", "comprises", and/or "comprising", when used 'in this description, specify the presence of stated elements, operations, and/or components, but do not preclude the presence or addition of one or more other elements, operations, and/or components. Furthermore, reference numerals, which are presented in the order of description, are provided according to the embodiments and are thus not necessarily limited to the order.

The embodiments of the inventive concept will be described with reference to example cross-sectional views and/or plan views. In the drawings, the dimensions of layers and regions are exaggerated for clarity of illustration. Therefore, the forms of the example drawings may be changed due to a manufacturing technology and/or error tolerance. Therefore, the embodiments of the inventive concept may involve changes of shapes depending on a manufacturing process, without being limited to the illustrated specific forms.

FIG. 1 illustrates an example of a typical optical heterodyne detection system 200.

Referring to FIG. 1, the typical optical heterodyne detection system 200 may include a light source 10, a photodetector 30, an electrical spectrum analyzer 40, an interferometer 50, a polarization controller 60, a high-frequency oscillator 12, an optical fiber retarder 14, and a frequency shifter 16. The light source 10 may generate light 11. The light source 10 may generate the light 11 that is continuous wave laser light. The photodetector 30 may detect the light 11. The electrical spectrum analyzer 40 may measure wavelength components of the light 11 using a detection signal of the light 11. The interferometer 50 may be provided between the light source 10 and the photodetector 30 and may modulate the light 11. The light 11 may be separated at an input coupler 52 of the interferometer 50 and interfered at an output coupler 54. The polarization controller 60 and the optical fiber retarder 14 may be connected in series to a first branch waveguide 55. The polarization controller 60 and the optical fiber retarder 14 may polarize and delay reference light 13 of the light 11. The frequency shifter 16 may be connected to a second branch waveguide 57. The frequency shifter 16 may be connected to the high-frequency oscillator 12. The frequency shifter 16 may generate modulated light by modulating the light 11. The high-frequency oscillator 12 may provide a pulse signal to the frequency shifter 16. Measurement light 15 may be pulsed by the pulse signal. The reference light 13 and the measurement light 15 may be interfered at the output coupler 54, thus generating a beating frequency signal 19.

Therefore, the typical optical heterodyne detection system 200 may necessarily include an external pulse light source of the high-frequency oscillator 12.

Figure 2:
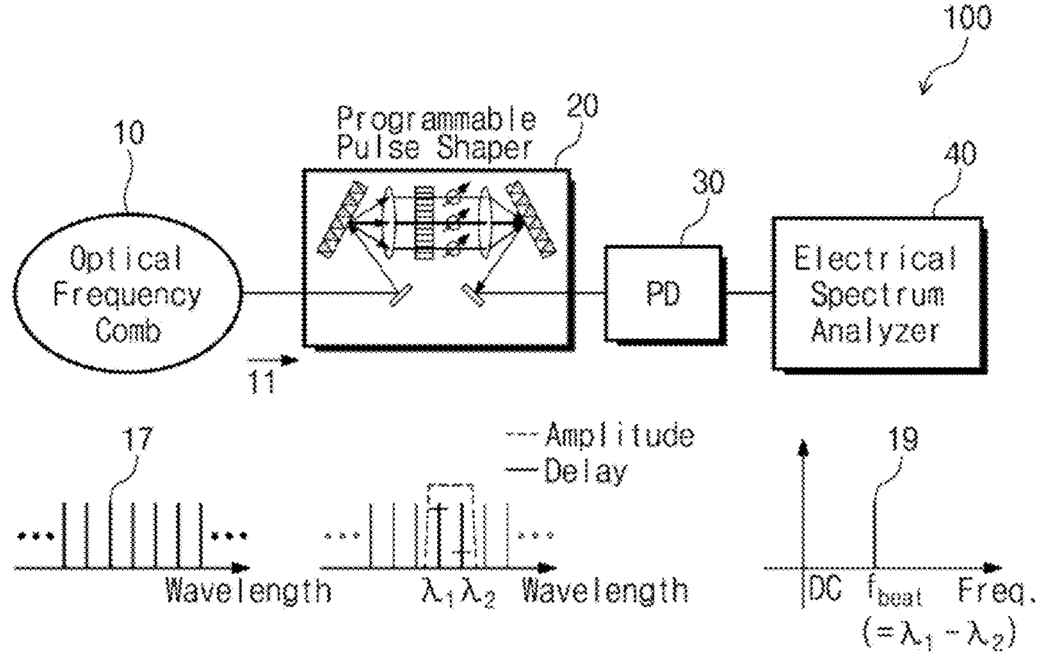
FIG. 2 is a diagram illustrating an example of an optical self-heterodyne detection system according to the inventive concept.

FIG. 2 illustrates an example of an optical self-heterodyne detection system 100 according to the inventive concept.

Referring to FIG. 2, the optical self-heterodyne detection system 100 of an embodiment of the inventive concept may not use a signal of the external reference light 13 generated by the high-frequency oscillator 12 of the typical optical heterodyne detection system 200, and may have a simple structure without the frequency shifter 16. The optical self-heterodyne detection system 100 of an embodiment of the inventive concept may a configuration for in-line self-heterodyne direct detection with a very simple structure. The optical self-heterodyne detection system 100 of an embodiment of the inventive concept may add a large degree of delay to the signal of the reference light 13 after simultaneously filtering the signal of the reference light 13 and a measurement light signal so as to apply different degrees of delay to the two light signals, thus enabling precise spectrum analysis with a sufficiently decoherent signal. According to an example, the optical self-heterodyne detection system 100 of an embodiment of the inventive concept may include a light source 10, a programmable filter 20, a photodetector 30, and an electrical spectrum analyzer 40.

The light source 10 may include an optical frequency comb light source. Light 11 generated by the light source 10 may have a frequency comb spectrum 17. The frequency comb spectrum 17 may include a wavelength comb spectrum or comb wavelengths, but an embodiment of the inventive concept is not limited thereto. The frequency comb spectrum 17 may have a center frequency of 1550 nm. The light source 10 may include an optical frequency comb for evaluating frequency stability. The light source 10 may be a light source having different frequency components due to presence of two or more modes. For example, the light source 10 may include electro-optic optical frequency comb, micro-comb, or mode-locked laser.

The programmable filter 20 may be provided adjacent to the light source 10. The programmable filter 20 may generate a decoherence signal by simultaneously filtering the reference light 13 and the measurement light 15 of the light 11. The programmable filter 20 may make it possible to measure a wideband laser linewidth from a narrow linewidth to a wide linewidth stably and for a long time by determining the beating frequency signal 19 based on a repetition rate of an optical frequency comb using the light source 10 that is an optical frequency comb light source.

The photodetector 30 may be provided between the programmable filter 20 and the electrical spectrum analyzer 40. The photodetector 30 may detect the light 11. For example, the photodetector 30 may include a photodiode.

The electrical spectrum analyzer 40 may be connected to the photodetector. The electrical spectrum analyzer 40 may analyze frequency and wavelength components of the light 11 by analyzing a light detection signal.

Therefore, the optical self-heterodyne detection system 100 of an embodiment of the inventive concept may measure a wideband laser linewidth stably and for a long time using the light source 10 that is an optical frequency comb light source.

Figure 3:
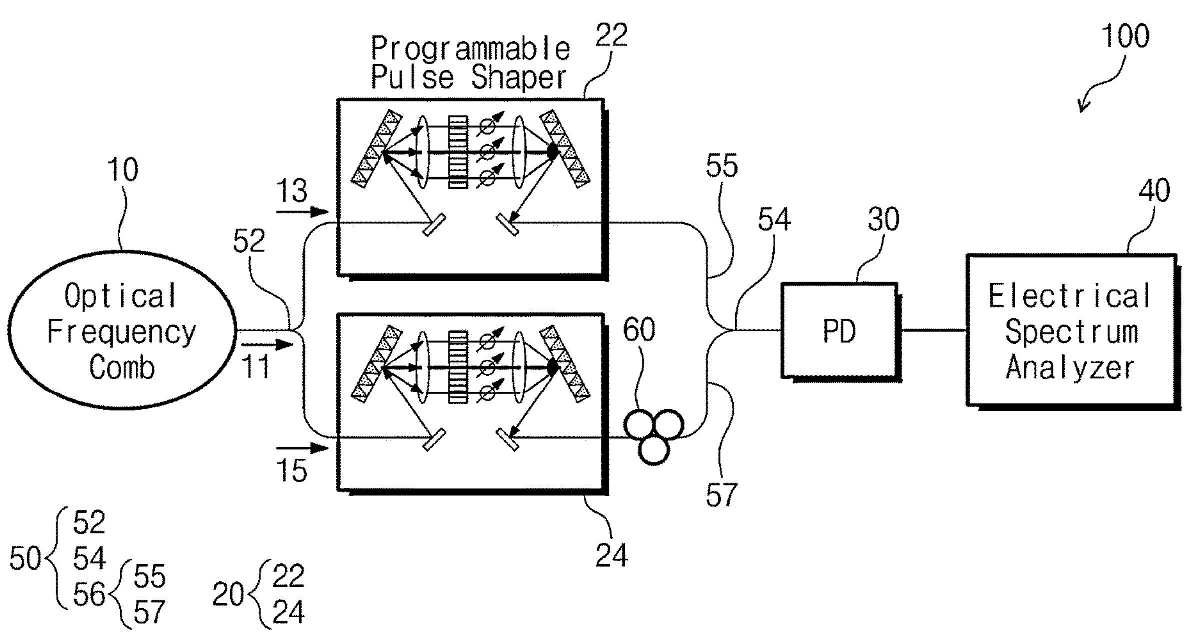
FIG. 3 is a diagram illustrating an example of an optical self-heterodyne detection system according to the inventive concept.
Figure 4:
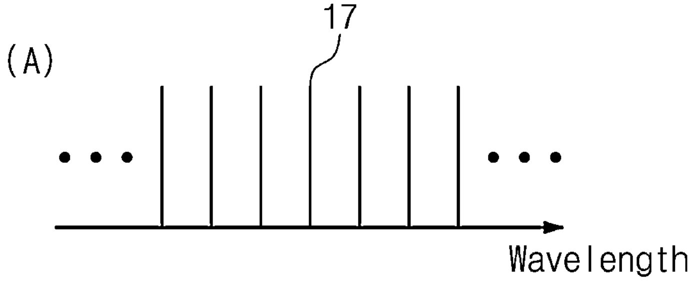
FIG. 4 illustrates graphs showing a frequency comb spectrum of the light, the reference light, and the measurement light of FIG. 3, a first peak wavelength, a second peak wavelength, and a beating frequency signal.
Figure 4:
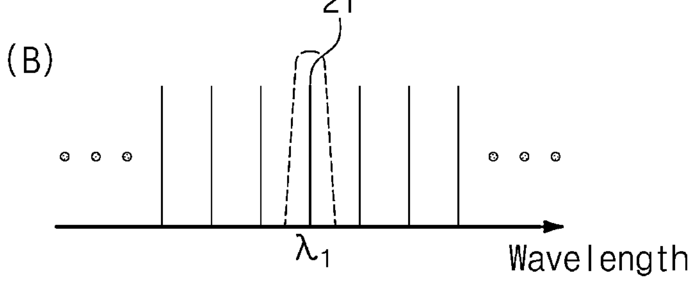
Figure 4:
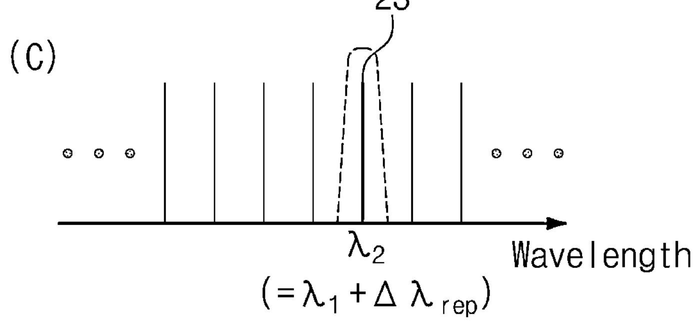
Figure 4:
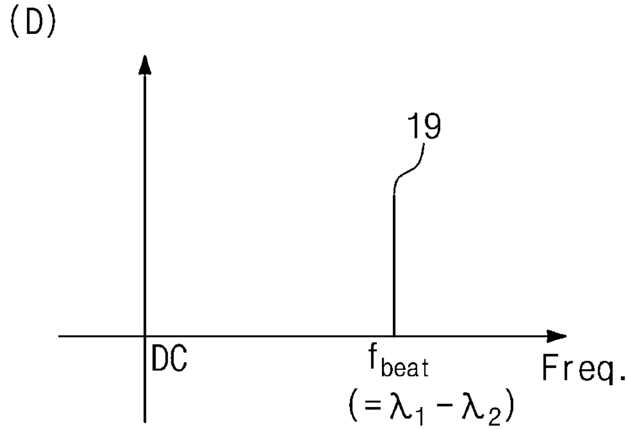

FIG. 3 illustrates an example of the optical self-heterodyne detection system 100 according to the inventive concept. FIG. 4 illustrates a frequency comb spectrum 17 of the light 11, the reference light 13, and the measurement light 15 of FIG. 3, a first peak wavelength 21, a second peak wavelength 23, and the beating frequency signal 19.

Referring to FIGS. 3 and 4, the optical self-heterodyne detection system 100 of an embodiment of the inventive concept may further include an interferometer 50.

The interferometer 50 may be provided between the light source 10 and the photodetector 30. The interferometer 50 may transfer the light 11 and cause interference thereof. For example, the interferometer 50 may include a Mach-Zehnder interferometer. The interferometer 50 may generate the beating frequency signal 19 of the light 11 by separating the light 11 having the frequency comb spectrum 17 into the reference light 13 and the measurement light 15 and causing interference of the reference light 13 and the measurement light 15. The reference light 13 and the measurement light 15 may have the first peak wavelength 21 and the second peak wavelength 23, respectively. The first peak wavelength 21 and the second peak wavelength 23 may be different from each other. According to an example, the interferometer 50 may include an input coupler 52, an output coupler 54, and branch waveguides 56. The input coupler 52 may be connected to the light source 10. The input coupler 52 may separate the light 11 at a ratio of about 1:1 and provide the separated light to the branch waveguides 56. The output coupler 54 may be connected to the photodetector 30. The output coupler 54 may cause interference of the light 11 in the branch waveguides 56. The branch waveguides 56 may be provided between the input coupler 52 and the output coupler 54. The branch waveguides 56 may branch off from the input coupler 52 and may be connected to the output coupler 54. According to an example, the branch waveguides 56 may include a first branch waveguide 55 and a second branch waveguide 57. The first branch waveguide 55 and the second branch waveguide 57 may be parallel with each other.

The programmable filters 20 may be respectively connected to the first branch waveguide 55 and the second branch waveguide 57. According to an example, the programmable filters 20 may include a first programmable filter 22 and a second programmable filter 24. The first programmable filter 22 may be connected in series to the first branch waveguide 55. The first programmable filter 22 may select the first peak wavelength 21 or first peak frequency of the reference light 13 in the first branch waveguide 55. The second programmable filter 24 may be connected in series to the second branch waveguide 57. The second programmable filter 24 may select the second peak wavelength 23 or second peak frequency of the measurement light 15 in the second branch waveguide 57. The first programmable filter 22 and the second programmable filter 24 may increase spectrum measurement reliability of the beating frequency signal 19 by appropriately setting a degree of delay according to a linewidth of the light 11 with an optical frequency comb. The first programmable filter 22 and the second programmable filter 24 may precisely adjust a magnitude of each frequency component according to an attenuation level of the light 11. Furthermore, the first programmable filter 22 and the second programmable filter 24 may adjust a degree of delay through a phase control function and a pig-tailed structure. For example, the first programmable filter 22 and the second programmable filter 24 each may include a programmable pulse shaper.

A polarization controller 60 may be connected to the second branch waveguide 57 between the second programmable filter 24 and the output coupler 54. The polarization controller 60 may control polarization of the measurement light 15 in the second branch waveguide 57. The measurement light 15 and the reference light 13 may interfere with each other in the output coupler 54, thus generating the beating frequency signal 19.

The light source 10, the photodetector 30, and the electrical spectrum analyzer 40 may be configured in the same manner as illustrated in FIG. 2.

Figure 5:
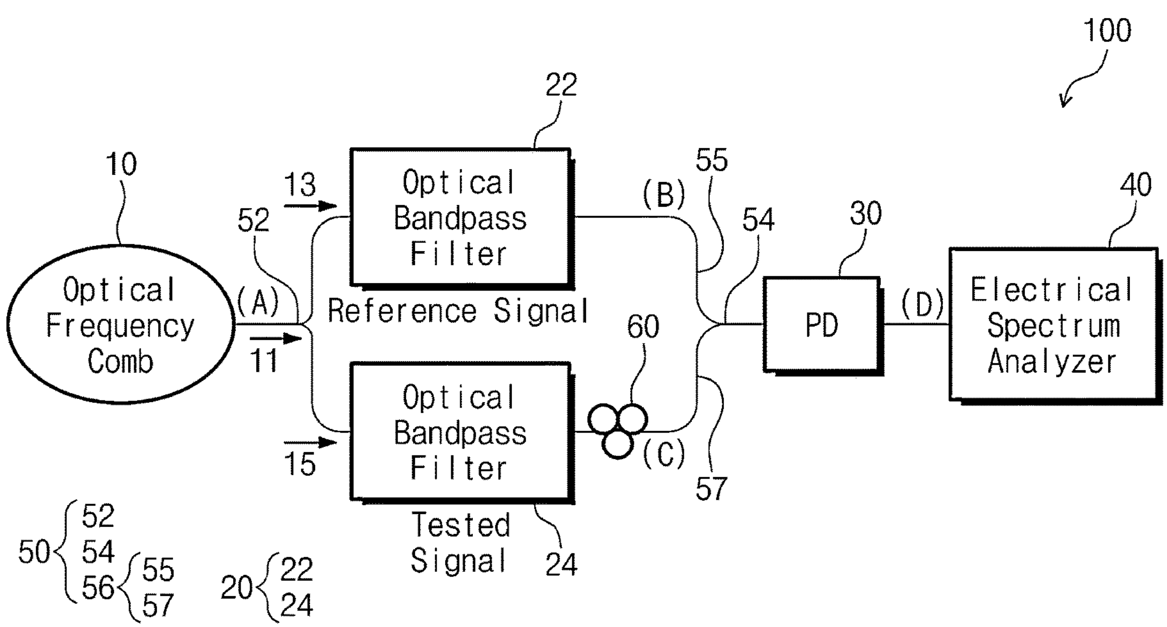
FIG. 5 is a diagram illustrating an example of an optical self-heterodyne detection system according to the inventive concept.

FIG. 5 illustrates an example of the optical self-heterodyne detection system 100 according to the inventive concept.

Referring to FIG. 5, the first programmable filter 22 and the second programmable filter 24 each may include an optical bandpass filter. The first programmable filter 22 and the second programmable filter 24 that are optical bandpass filters may respectively select the first peak wavelength 21 and the second peak wavelength 23 of the reference light 13 and the measurement light 15.

The light source 10, the photodetector 30, the electrical spectrum analyzer 40, the interferometer 50, and the polarization controller 60 may be configured in the same manner as illustrated in FIG. 3.

Figure 6:
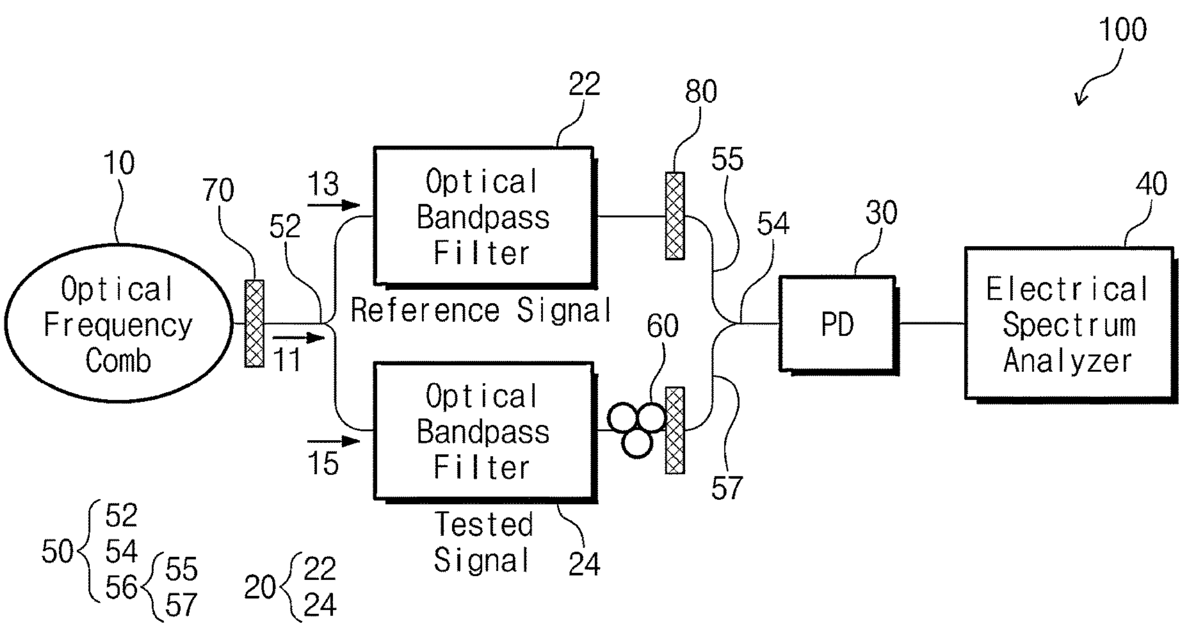
FIG. 6 is a diagram illustrating an example of an optical self-heterodyne detection system according to the inventive concept.

FIG. 6 illustrates an example of the optical self-heterodyne detection system 100 according to the inventive concept.

Referring to FIG. 6, the optical self-heterodyne detection system 100 of an embodiment of the inventive concept may further include a first nonlinear crystal plate 70 and second nonlinear crystal plates 80.

The first nonlinear crystal plate 70 may be provided between the light source 10 and the input coupler 52. The first nonlinear crystal plate 70 may increase a bandwidth of the light 11. The first nonlinear crystal plate 70 may include beta barium borate (BBO), periodically poled potassium titanyl phosphate (PPKTP), and periodically poled lithium niobate (PPLN). Alternatively, the first nonlinear crystal plate 70 may include inorganic materials such as silicon (Si), silicon nitride (SIN), aluminum gallium arsenide (AlGaAs), or silicon carbide (SiC), but an embodiment of the inventive concept is not limited thereto.

The second nonlinear crystal plates 80 may be provided between the programmable filter 20 and the output coupler 54. One of the second nonlinear crystal plates 80 may be provided in the first branch waveguide 55 between the first programmable filter 22 and the output coupler 54. The other one of the second nonlinear crystal plates 80 may be provided in the second branch waveguide 57 between the second programmable filter 24 and the output coupler 54. The second nonlinear crystal plates 80 each may have a thickness smaller than a thickness of the first nonlinear crystal plate 70. The second nonlinear crystal plates 80 may have the same thickness. The second nonlinear crystal plates 80 may increase bandwidths of the reference light 13 and the measurement light 15 of the light 11. The second nonlinear crystal plates 80 may have the same material as that of the first nonlinear crystal plate 70. For example, the second nonlinear crystal plates 80 may include beta barium borate (BBO), periodically poled potassium titanyl phosphate (PPKTP), and periodically poled lithium niobate (PPLN). Alternatively, the second nonlinear crystal plates 80 may include inorganic materials such as silicon (Si), silicon nitride (SiN), aluminum gallium arsenide (AlGaAs), or silicon carbide (SiC), but an embodiment of the inventive concept is not limited thereto.

The light source 10, the photodetector 30, the electrical spectrum analyzer 40, the interferometer 50, and the polarization controller 60 may be configured in the same manner as illustrated in FIG. 5.

Figure 7:
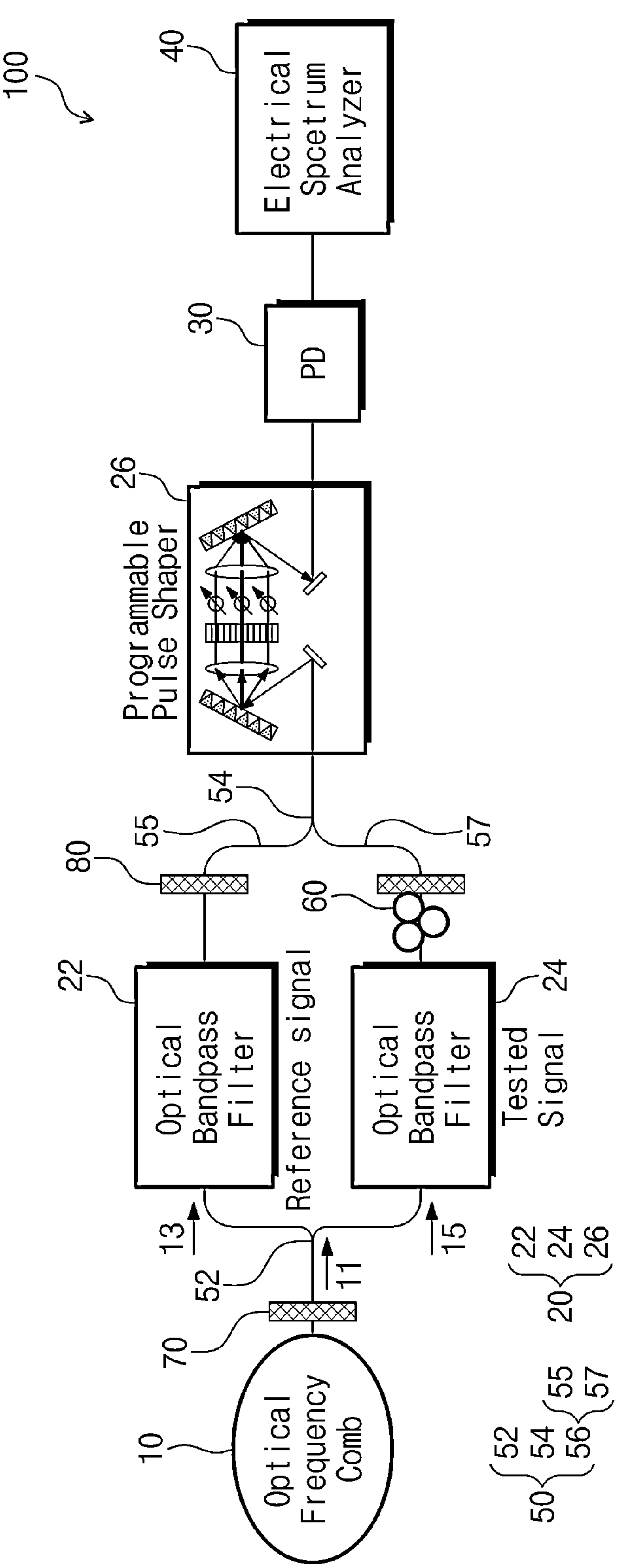
FIG. 7 is a diagram illustrating an example of an optical self-heterodyne detection system according to the inventive concept.

FIG. 7 illustrates an example of the optical self-heterodyne detection system 100 according to the inventive concept.

Referring to FIG. 7, the programmable filters 20 of the optical self-heterodyne detection system 100 of an embodiment of the inventive concept may further include a third programmable filter 26.

The third programmable filter 26 may be provided between the output coupler 54 and the photodetector 30. The third programmable filter 26 may include a pulse shaper. The third programmable filter 26 may eliminate noise of the second nonlinear crystal plates 80.

The light source 10, the photodetector 30, the electrical spectrum analyzer 40, the interferometer 50, the polarization controller 60, the first programmable filter 22, and the second programmable filter 24 may be configured in the same manner as illustrated in FIG. 6.

As described above, the optical self-heterodyne detection system according to an embodiment of the inventive concept may measure a wideband laser linewidth stably and for a long time using an optical frequency comb light source.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. An optical self-heterodyne detection system comprising:
- a light source configured to generate light;
- a photodetector configured to detect the light;
- a programmable filter provided between the photodetector and the light source; and
- an electrical spectrum analyzer connected to the photodetector and configured to analyze a frequency and wavelength of the light using a detection signal of the photodetector,
- wherein the light source includes a frequency comb light source,
- wherein the optical self-heterodyne detection system further comprises an interferometer,
  - wherein the interferometer includes:
  - an input coupler provided between the light source and the programmable filter;
  - an output coupler provided between the programmable filter and the photodetector; and
  - branch waveguides branching off from the input coupler and connected to the output coupler,
  - wherein the branch waveguides include:
    - a first branch waveguide; and
    - a second branch waveguide that is in parallel with the first branch waveguide, and
- wherein the programmable filter includes:
  - a first programmable filter provided to the first branch waveguide; and
  - a second programmable filter provided to the second branch waveguide.

2. The optical self-heterodyne detection system of claim 1, wherein the first and second programmable filters each include a pulse shaper.

3. The optical self-heterodyne detection system of claim 1, wherein the first and second programmable filters each include an optical bandpass filter.

4. An optical self-heterodyne detection system comprising:
- a frequency comb light source configured to generate light;
- a photodetector configured to detect the light;
- an electrical spectrum analyzer connected to the photodetector and configured to analyze a frequency and wavelength of the light using a detection signal of the photodetector;
- an interferometer including an input coupler provided between the frequency comb light source and the photodetector and receiving the light, branch waveguides branching off from the input coupler, and an output coupler connected to the branch waveguides; and
- programmable filters provided to the branch waveguides and selecting peak wavelengths of the light.

5. The optical self-heterodyne detection system of claim 4, wherein the programmable filters each include a pulse shaper or an optical bandpass filter.

6. The optical self-heterodyne detection system of claim 4, wherein the branch waveguides include:
- a first branch waveguide; and
- a second branch waveguide that is in parallel with the first branch waveguide.

7. The optical self-heterodyne detection system of claim 6, wherein the programmable filters include:
- a first programmable filter connected to the first branch waveguide; and
- a second programmable filter connected to the second branch waveguide.

8. The optical self-heterodyne detection system of claim 7, further comprising a polarization controller connected to the second branch waveguide between the second programmable filter and the output coupler.

9. An optical self-heterodyne detection system comprising:
- a frequency comb light source configured to generate light;
- a photodetector configured to detect the light;
- an electrical spectrum analyzer connected to the photodetector and configured to analyze a frequency and wavelength of the light using a detection signal of the photodetector;
- an interferometer including an input coupler provided between the frequency comb light source and the photodetector and receiving the light, first and second branch waveguides branching off from the input coupler, and an output coupler connected to the first and second branch waveguides;

first and second programmable filters provided to the first and second branch waveguides and selecting peak wavelengths of the light; and a first nonlinear crystal plate provided between the frequency comb light source and the input coupler.

10. The optical self-heterodyne detection system of claim 9, further comprising second nonlinear crystal plates between the programmable filters and the output coupler.

11. The optical self-heterodyne detection system of claim 10, wherein the first nonlinear crystal plate and the second nonlinear crystal plates include beta barium borate (BBO), periodically poled potassium titanyl phosphate (PPKTP), and periodically poled lithium niobate (PPLN).

12. The optical self-heterodyne detection system of claim 10, wherein the first nonlinear crystal plate and the second nonlinear crystal plates include silicon (Si), silicon nitride (SiN), aluminum gallium arsenide (AlGaAs), or silicon carbide (SiC).

13. The optical self-heterodyne detection system of claim 9, further comprising a third programmable filter provided between the output coupler and the photodetector.

* * * * *